United States Patent Office 3,419,889
Patented Dec. 31, 1968

3,419,889
HYDRAULIC PRESS FOR MANUFACTURING HOLLOW RUBBER ARTICLES, E.G., DIAPHRAGMS FOR TYPE SHAPERS-VULCANIZERS
Grigory Nickolaevich Krugljachenko, Nickolai Iljich Alexeev, Natan Iosifovich Naiguz, Vladimir Emmanuilovich Leibovich, Grigory Izraljevich Shmunis, and Mikhail Galileevich Brandenburgsky, Odessa, U.S.S.R., assignors to Zavod Pressov, Odessa, U.S.S.R.
Filed Oct. 14, 1964, Ser. No. 403,866
5 Claims. (Cl. 18—17)

ABSTRACT OF THE DISCLOSURE

A hydraulic press having a plunger of a main cylinder provided with a hole which can be closed during the press operation by shutters moving along guide rails on the upper end of the plunger. The force of the plunger is imparted to a moving crossarm which is connected to an intermediate rod which is slidable in the hole of the plunger at the end of travel of the intermediate rod.

The present invention relates to a hydraulic press for manufacturing hollow rubber articles, e.g., diaphragms for tire vulcanizers and shapers.

There are known hydraulic presses for the manufacture of hollow rubber articles, e.g., diaphragms for shapers-vulcanizers, comprising a lower crossbar with a main cylinder and plunger installed on the foundation, an upper cross bar with a heated upper part of the pressform and a core, columns securing the lower and upper crossbars, a moving crossarm with a heated lower part of the pressform which moves along the columns under the action of the accelerating, return and main cylinders, and a locking disc located in the lower part of the pressform and fixed to the upper crossbar of the cylinder to move the core rigidly connected to its rod.

In the existing presses the main cylinder and its plunger transmit nominal pressing force directly to the moving crossarm to move the main cylinder plunger together with the latter within its entire travel.

The drawback of the known presses is the considerable idle travel of the main plunger which results in the increase in the mass of metal required for the press, its height, depth of the foundation, volume of the working fluid used in the hydraulic system and area required for the hydraulic drive.

Moreover, the aforesaid drawback of the known presses causes increase in the energy consumed and consequently decreases the press efficiency.

Also, a drawback of the existing presses intended for the manufacture of the diaphragms is either the absence of heating the core, said core being used in forming the interior of the diaphragm, or its heating via the rack of the intermediate mechanism driven by the hydraulic cylinder.

An object of the present invention is to provide a manufacturing press for diaphragms which ensures its high quality with a lower mass of metal required for the press, less height and, foundation depth, less volume of working fluid used in the hydraulic system, and less energy consumed, e.g., increased efficiency. Said press will ensure heating the core via the core moving cylinder rod.

This object is achieved in that the plunger of the main cylinder is provided with a hole which can be closed during the pressing operation by shutters moving along the guide rails on the upper end of the main plunger, the guide rails being rigidly connected to the main plunger, the intermediate rod located in the central hole of the main plunger being rigidly connected to the moving crossarm and imparting to the latter the nominal press force from the main plunger, guide rails and shutters at the end of the travel only.

It has become possible because during the process of the diaphragms manufacture, it is sufficient, that the nominal pressing force occurs only in moment the raw rubber is squeezed out into the volume formed by the parts of the pressform, core and locking disc. The object is also achieved due to the ulitization of the intermediate rod as the locking disc moving cylinder and due to employment of semi-bushings secured on the shutters, which permit changing over from one size of the diaphragms to the other.

Besides, to achieve these objects the rod of the core moving cylinder is provided with a hole for delivering steam into the core and fitted with an adjustable pipe secured in the rod draining off condensate.

The design of the press for the manufacture of the diaphragms produced in conformity with this invention can be used in vertical presses of any purpose with the up and down pressure, whose moving crossarm (working table) travel with a nominal press force (pressing travel) is several times less than the full travel.

Depending on the ratio of the moving crossarm full travel and pressing travel, the main cylinder may be either of a simple closed type or differentially-plunger type.

The hydraulic press for the manufacture of the diaphragms produced in accordance with this invention, ensures the production of high-quality articles at a semiautomatic rating, increases the labour productivity and decreases the number of technical personnel.

The essence of the invention is illustrated by a detailed description of an embodiment of the invention in reference with the appended drawings, wherein.

Figure 1:
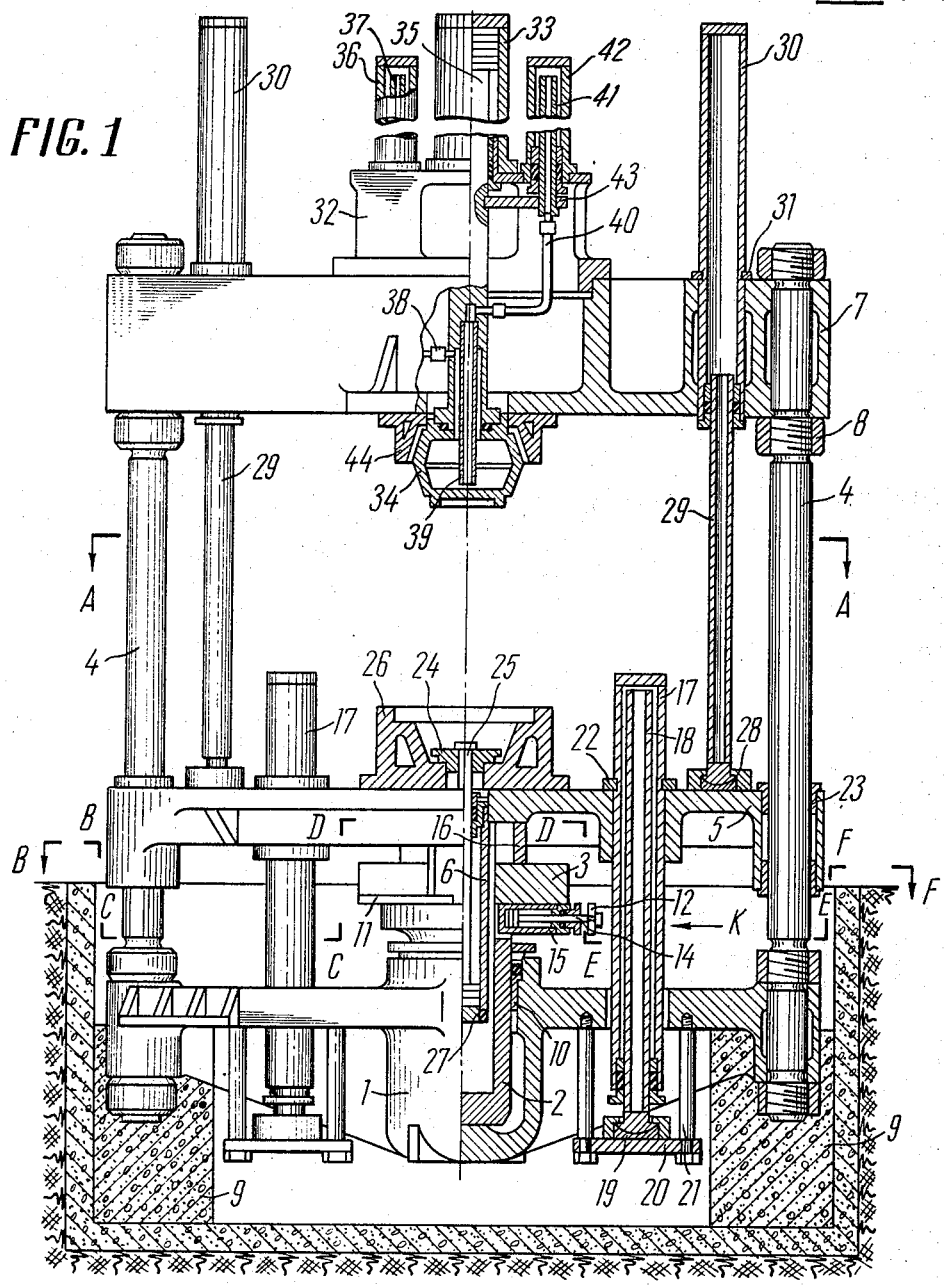
FIG. 1 is an elevation view partly in section of a hydraulic press for manufacturing diaphragms for the shapers-vulcanizers.
Figure 4:
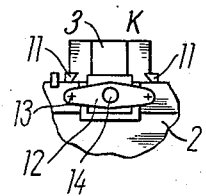
Figure 5:
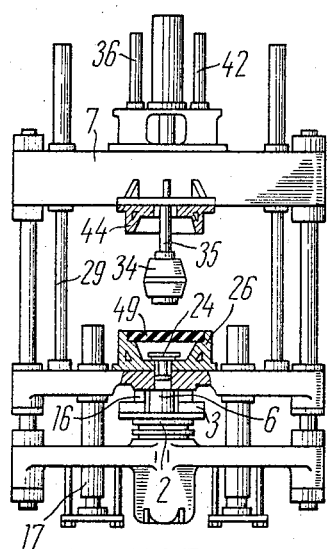
Figure 6:
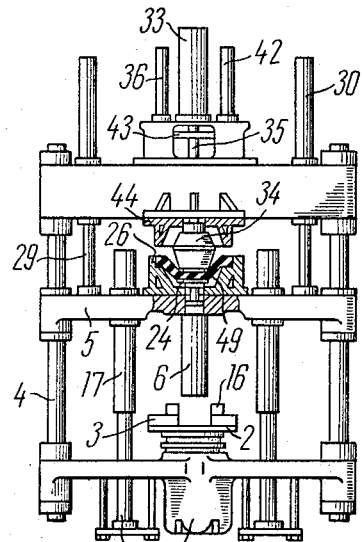
Figure 7:
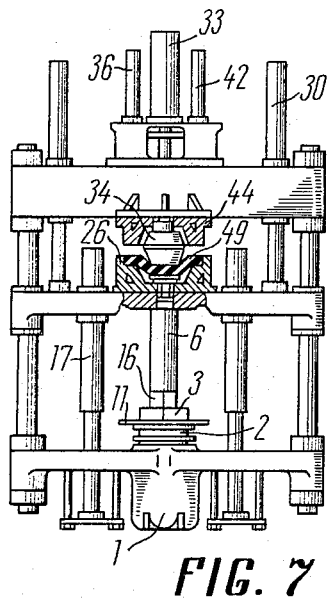
Figure 8:
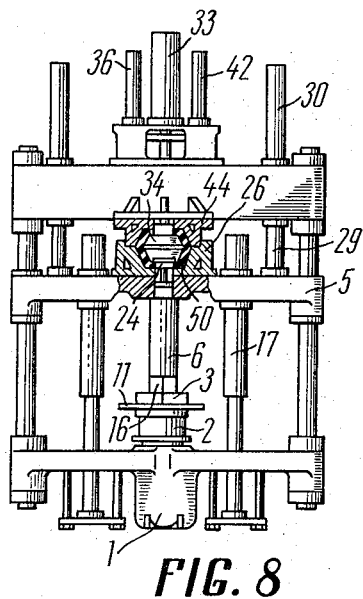
Figure 9:
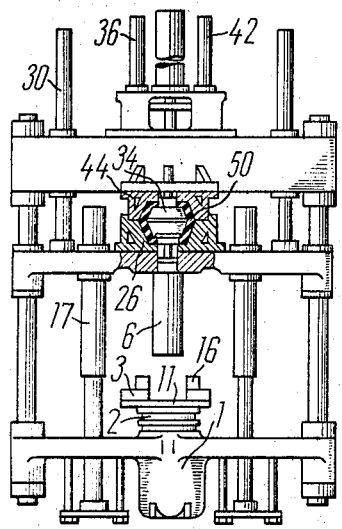
Figure 10:
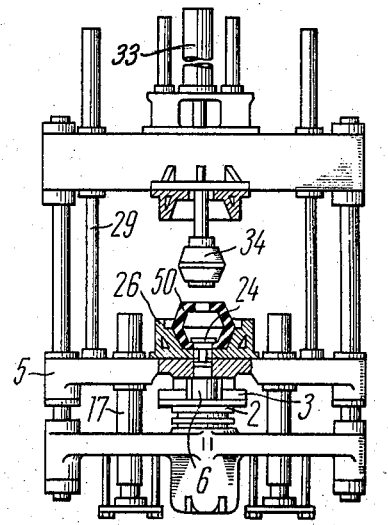
Figure 11:
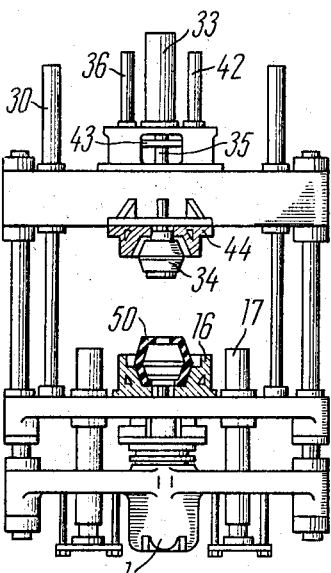
Figure 12:
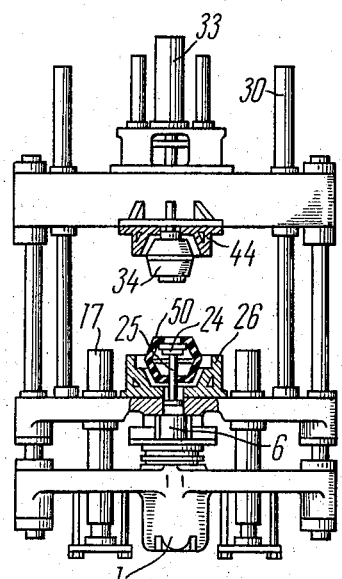

FIG. 4 is an elevation view of a shutter with its moving cylinder showing their installation on the main plunger as viewed in the direction of arrow K in FIG. 1, FIG. 5 shows the press in its initial position with the work-piece to be loaded in the pressform, FIG. 6 shows the press in position when accelerated (idle) travel of the crossarm is accomplished, FIG. 7 illustrates the press with the closed shutters and before starting the pressing (operating) travel, FIG. 8 shows the press at the end of the pressing operation and during a delay in the process of the diaphragm shaping and vulcanizing, FIG. 9 shows the press with the open shutters and main plunger lowered after the process of the diaphragm vulcanization has been completed, FIG. 10 shows the press with the core and moving crossarm lowered after the diaphragm has been removed from the upper part of the pressform and core, FIG. 11 shows the press with the core lifted to ensure the removal of the diaphragm from the lower part of the pressform, and FIG. 12 shows the press with the locking disc lifted which pushes the diaphragm from the lower part of the pressform.

Figure 2:
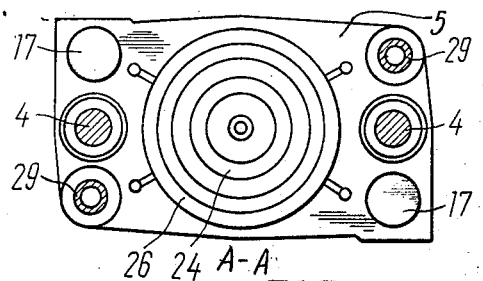
FIG. 2 is a sectional view along line AA in FIG. 1.
Figure 3:
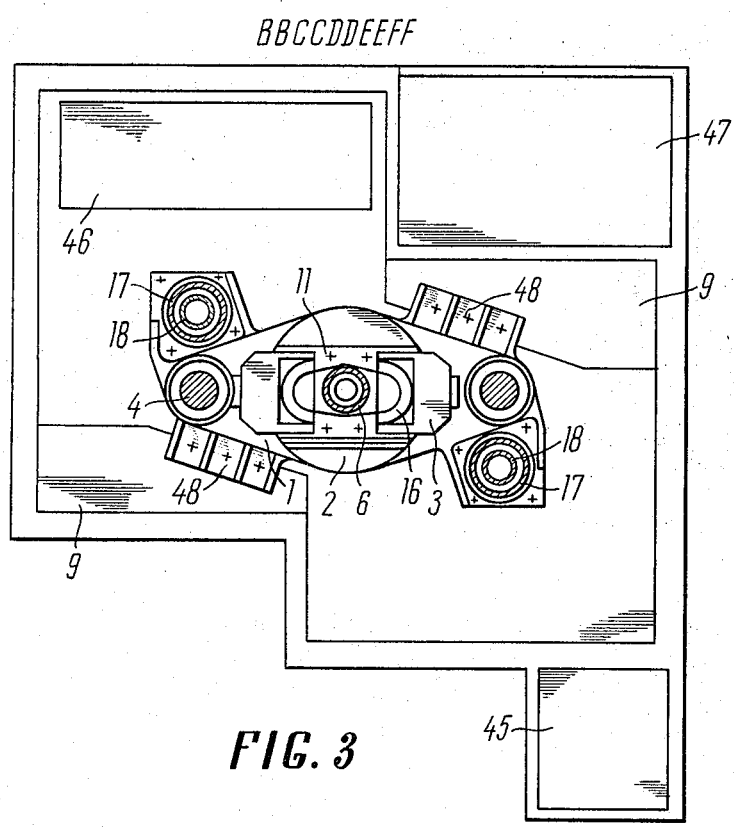
FIG. 3 is a sectional view taken along line BBCCDDEEFF in FIG. 1.

The hydraulic press for manufacturing the diaphragms for the shapers-vulcanizers used for shaping and vulcanizing the tires is constructed as follows:

Installed in the lower crossbar 1 (FIGS. 1, 3) cast integrally with the main cylinder is a main plunger 2 with shutters 3 (FIGS. 1 and 3) mounted therein, and columns 4 (FIGS. 1, 3) attached to the plunger sides. Crossarm 5 (FIGS. 1, 2) is movably mounted on columns 4 and supports an intermediate rod 6 (FIG. 1). At the top of columns 4, an upper crossbar 7 is fastened. Lower crossbar 1 and upper crossbar 7 secured to columns 4 by nuts 8 and form a closed frame assembly whose lower crossbar 1 is installed on foundation supports 9 (FIGS. 1, 3). Main plunger 2 (FIG. 1) has a central hole for installation of intermediate rod 6 and is guided in a main cylinder in crossbar 1 by bronze bushing 10. Attached to the upper end of main plunger 2 (FIGS. 1, 3, 4) are guide rails 11 for moving shutters 3. Fastened to the flange of main plunger 2 (FIGS. 1, 4) from both sides by means of cross-piece 12 and pins 13 is rod 14 of shutters 3 moving cylinder 15 (FIG. 1).

Cylinders 15 are fastened from underneath to the stops of shutters 3. Attached to the upper sides of shutters 3 (FIGS. 1, 3) are changeable semi-bushings 16.

The main cylinder in the crossbar 1 is provided with a hole (not shown) for delivering off the working fluid; said holes are not shown on the drawings. Accelerating cylinders 17 pass through lower crossbar 1 (FIGS. 1, 3).

Plungers 18 (FIG. 1) of accelerating cylinders 17 are attached to lower crossbar 1 via ball pivots 19, plates 20 and pins 21. Accelerating cylinders 17 are secured to moving crossarm 5 by means of removable half-rings 22.

Crossarm 5 moves along columns 4 by means of guide bushings 23. When crossarm 5 is in the extreme lower position it rests either upon replaceable semi-bushings 16 or shutters 3 if semi-bushings are absent.

Fastened to moving crossarm 5 from underneath is intermediate rod 6 which simultaneously serves as a moving cylinder of locking disc 24 attached to rod 25 and installed in the lower moving part of pressform 26. Working fluid is supplied to cylinder 6 via a telescope connection on flexible pipes. Attached to the lower end of intermediate cylinder 6 is replaceable ring 27 receiving the press nominal force from shutters 3. The lower part of pressform 26 (FIGS. 1, 2) is fastened to moving crossarm 5. Secured to the upper surface of moving crossarm 5 (FIG. 1) by means of ball pivots 28 are plungers 29 of return cylinders 30 fixed, in their turn, to the upper crossbar 7 by means of removable half-rings 31. On the upper surface of upper crossbar 7 is secured an intermediate barrel 32; the latter facilitates maintenance of cylinder 33 which moves core 34 secured to rod 35. Cylinder 33 is fixed to barrel 32. Steam is supplied via a telescopic means into core 34 by cylinder 36, plunger 37 and pipe 38 via rod 35. Condensate is also drained from core 34 via telescopic means by help of adjustable pipe 39 through rod 35, pipe 40, plunger 41 and rod 42. Plungers 37 and 41 are connected to rod 35 by means of cross-piece 43. Attached to lower surface of upper crossbar 7 is the upper stationary part of press form 44 which houses core 34. The parts of press form 26 and 44 and core 34 is heated by steam; they are controlled and adjusted by equipment (not shown) installed on control panel 45 (FIG. 3).

The hydraulic cylinders are supplied by pumping station 46 from hydraulic drive 47 on which are mounted the hydraulic equipment of the press and oil cooler (not shown on the drawing). Control panel 45, pumping station 46 and hydraulic drive 47 are schematically shown in the drawing. The press is secured to the foundation by foundation bolts 48 (FIG. 3).

The press can operate both at the adjusting and semi-automatic rating. Commands for changing over from one element of the cycle to the other are delivered by limit switches which fix the extreme position of one or the other operating unit by hydraulic system pressure and a timer (not shown on the drawings).

The order of motion of the press operating units are shown in FIGS. 5–12 which show the diaphragm production cycle. The initial position of the press during loading of the workpiece is illustrated in FIG. 5.

Moving crossarm 5 is in the extreme lower position and depending on the size of the diaphragm being manufactured the latter rests either upon semi-bushings or shutters 3. Moving crossarm takes the position indicated above by gravity. Intermediate rod 6 is located in the central hole of main plunger 2, shutters 3 with semi-bushings 16 being open, and plungers 29 of return cylinders being set in the extreme lower position. Core 34, plungers 37, and 41 and cylinders 36 and 42 telescopically connected with said core are in the extreme upper or lower positions, depending upon the facility of loading the workpiece. The main cylinder in the crossbar 1 communicates with the drain line and main plunger 2 is in the extreme lower position; the plunger resting upon the bottom of the main cylinder. The lower part of pressform 26 is loaded with workpiece 49. After loading, the operator from control panel 45 (FIG. 3) switches over the press to the automatic rating.

The press operates as follows. The operating fluid is delivered to accelerating cylinders 17 (FIG. 6) and moving crossarm 5 moves rapidly until intermediate rod 6 reaches the position above semi-bushings 16. In this case cylinders 30 are connected to the drain line.

During the accelerated travel of moving crossarm 5, the lower part of pressform 26 with workpiece 49 encounters core 34 and pushes it up, whereby the workpiece 49 is somewhat deformed. Both cavities of cylinder 33 moving core 34 are connected to the drain line.

After the accelerated travel of moving crossarm 5 is over, the next element of the cycle-closing of shutters 3 begins (FIG. 7).

In this case working fluid in the accelerating cylinders is blocked due to which the possibility of lowering moving cross arm 5 is eliminated. Working fluid is delivered inti cylinders 15 (FIG. 1) moving shutters 3 to close shutters 3 (FIG. 7).

When the shutters 3 (FIGS. 1, 3, 4) move along guide rails 11 they close the central hole of main plunger 2 (FIGS. 1, 7).

After shutters 3 (FIG. 7) are closed, a high pressure line is switched on, and operating fluid is delivered to the main cylinder in lower crossbar (FIG. 8) whereby main plunger 2 is lifted until press form parts 26 and 34 are completely joined.

The nominal press force created by the main cylinder is transmitted by main plunger 2 through guide rails 11, shutters 3, semi-bushings 16, intermediate rod 6, moving crossarm 5 to the lower moving part of pressform 26. Owing to this, the workpiece spreads and fills the space defined by the parts of pressform 26 and 44, core 34, and locking disc 24, to form diaphragm 50 of desired shape. Accelerating cylinders 17 are connected to the delivery line and return cylinders 30 to the drain line. After parts 26 and 44 and of the pressform are completely joined, the working fluid pressure in the main cylinder in lower crossbar 1 increases up to the required limit and after this has been effected the press is fully disconnected from the delivery lines. The process of the diaphragm vulcanization takes place.

Upon completion of the vulcanization process, accelerating cylinders 17 (FIG. 9) are connected to the delivery line and the main cylinder in lower crossbar 1 to the drain line. Simultaneously shutters 3 moving cylinders 15 (FIG. 1) are linked to the delivery line whereby said shutters are opened.

Main plunger 2 is lowered simultaneously with the opening of shutters 3, and thus the central hole in main plunger 2 is opened.

Due to a complete lowering of main plunger 2 and opening of shutters 3 (FIG. 9) it is possible to pass over to the next stage of the cycle.

Meanwhile, accelerating cylinders 17 (FIG. 10) are connected to the drain line and return cylinders 30 and the cavity of intermediate rod 6 to the delivery line.

Both cavities of cylinder 33 are connected to the drain line. Moving crossarm 5 is lowered and diaphragm 50 is removed from the pressform upper part 44 and core 34. In this case, diaphragm 50 is held in the lower part of pressform 26 by locking disc 24. Intermediate rod 6 enters the central hole of main plunger 2. Moving crossarm 5 is fully lowered in semi-bushings 16 or shutters 3 if half-bushings 16 are omitted, and after that the next stage of the cycle, i.e., a lifting of core 34 takes place, this being required for the removal of diaphragm 50 from the lower part of pressform 26.

The rod cavity of core 34 (FIG. 11) is connected to the delivery line and the piston cavity to the drain line. Upon completion of the lifting of core 34 the last stage of the shaping and vulcanization cycle commences, i.e., removal of diaphragm 50 from the lower part of pressform 26.

Locking disc 24 (FIG. 12) serves as a pusher.

In this case the piston cavity of locking disc 24 of moving rod 6 is connected to the delivery line and the rod cavity to the drain line. Iocking disc 24 moves up and after it reaches diaphragm 50, it pushes the latter from the lower part of pressform 26 and after that the operation cycle of the press is repeated.

During the press operation, only main cylinder 1 (FIG. 1) is connected to the high pressure line while the rest of cylinders 6, 15, 17 and 3 are connected to the lower pressure line.

When realizing the preferred form of the invention, it is recommended to manufacture the diaphragms for the shapers-vulcanizers of 40″–50″ on a press applying a force of 400 tons and diaphragms for shapers-vulcanizers of 75″–88″ on a press applying a force of 800 tons.

The present invention is described in terms of the preferable realization and manufacture of one type of the article, i.e., diaphgrams, it being apparent that various modifications of the described invention may be effected by persons skilled in the art without departing from the principle and scope of the invention as described in the appended claims.

What is claimed is:

1. A hydraulic press for the manufacture of hollow rubber articles comprising a lower crossbar with a main cylinder and a plunger mounted on a foundation; said plunger having an axial hole, a pressmould having two heated parts; and upper crossbar with one heated part of said pressmould and a core, columns connecting said lower crossbar to the upper one, a moving crossarm with the other heated part of the pressmould which moves along said columns, a locking disc located in the lower part of said pressmould on said moving crossarm; an intermediate rod located in said axial hole of said plunger and secured to said moving crossarm; accelerating cylinders, fastened to said lower crossbar, permitting an accelerated travel of said moving crossarm with said intermediate rod until the latter leaves said plunger; guide rails fastened to the end of said plunger of said main cylinder; means moving along said guide rails main for closing the axial hole of said main plunger after said intermediate rod leaves the latter, said intermediate rod transmitting nominal press force via said guide rails, means for closing the hole of said plunger and moving the crossarm to the pressmould during the operating stroke of said plunger; return cynilders mounted on said upper crossbar and for setting said moving crossarm in an initial position; and a cylinder for moving said core rigidly linked to its rod.

2. A hydraulic press for the manufacture of hollow rubber articles, comprising a lower crossbar with a main cylinder and plunger mounted on a foundation; said plunger having an axial hole; a pressmould having two heated parts; an upper crossbar with one heated part of the pressmould and a core; columns connecting said lower crossbar to the upper one; a moving crossarm with the other heated part of said pressmould, which moves along said columns, a locking disk located on said moving crossarm in the lower part of said pressmould; an intermediate rod located in said axial hole of said plunger and secured to said moving crossarm; accelerating cylinders, fastened to said lower crossbar permitting an accelerated travel of said moving crossarm with said intermediate rod until the latter leaves said plunger; guide rails fastened to the end of said plunger of said main cylinder; means movable along said guide rails for closing the axial hole of the plunger after said intermediate rod leaves the latter, replaceable semi-bushings, mounted on said means for closing the axial hole of said plunger and providing for the transition from one range of sizes of articles to be produced to another; return cylinders, fixed on said upper crossbar for setting said moving crossarm in an initial position; and a cylinder for moving said core rigidly connected to its rod.

3. A hydraulic press for the manufacture of hollow rubber articles, comprising a lower crossbar with a main cylinder and plunger mounted on a foundation; said plunger having an axial hole; a pressmould having two heated parts; an upper crossbar with one heated part of the pressmould and core; columns connecting said lower crossbar to the upper one; a moving crossarm with the other heated part of said pressform which moves along said columns, a locking disk located on said moving crossarm in the lower part of said pressmould; an intermediate rod located in said axial hole of said plunger; a further rod slidably mounted in said intermediate rod and connected to said locking disk for moving said locking disk; accelerating cylinders, fastened to said lower crossbar permitting an accelerated travel of said moving crossarm with said intermediate rod until the latter leaves said plunger; guide rails fastened to the end of said plunger of said main cylinder; means for closing the axial hole of the plunger after said intermediate rod leaves the latter, the latter said means being movable along said guide rails; replaceable semi-bushings mounted on said means for closing the axial hole of said plunger and providing for the transition from one range of sizes of articles to be produced to another; return cylinders, mounted on said upper crossbar for setting said moving crossarm in an initial position; and a cylinder for moving said core rigidly linked to its rod.

4. A hydraulic press for the manufacture of hollow rubber articles, comprising a lower crossbar with a main cylinder and a plunger mounted on a foundation; said plunger having an axial hole; a pressmould having two heated parts; an upper crossbar with one heated part of the pressmould and a core; columns connecting said lower crossbar to the upper one; a moving crossarm with the other heated part of said pressmould which moves along said columns, a locking disk located on said moving crossarm in the lower part of said pressmould; an intermediate rod located in said axial hole of said plunger and attached to said moving crossarm, a further rod slidably mounted in said intermediate rod and connected to said locking disk for moving said locking disk; accelerating cylinders, fastened to said lower crossbar permitting an accelerated travel of said moving crossarm with said intermediate rod until the latter leaves said plunger; guide rails fastened to the end of said plunger of said main cylinder; shutters for closing said axial hole of said plunger after said intermediate rod leaves the plunger; said shutters being movable along said guide rails, replaceable semi-bushings mounted on said shutters and providing for the transition from one range of sizes of articles to be produced to another; return cylinders mounted on said upper crossbar for setting said moving crossarm in an initial position; and a cylinder for moving said core rigidly linked to its rod.

5. A hydraulic press for the manufacture of hollow rubber articles, comprising a lower crossbar with a main cylinder and a plunger mounted on a foundation; said plunger having an axial hole; a pressmould having two heated parts; an upper crossbar with one heated part of the pressmould and a core; columns connecting said lower crossbar to the upper one; a moving crossarm with the other heated part of said pressmould which moves along said columns; a locking disk located on said moving crossarm in the lower part of said pressmould; an intermediate rod located in said axial hole of said plunger, secured to said moving crossarm, a further rod slidably mounted in said intermediate rod and connected to said locking disk for moving said locking disk; accelerating cylinders, fastened to said lower crossbar permitting an accelerated travel of said moving crossarm with said intermediate rod until the latter leaves said plunger; guide rails fastened to the end of said plunger of said main cylinder; shutters movable on said guide rails for closing said axial hole of said plunger after said intermediate rod leaves said plunger; replaceable semi-bushings mounted on said shutters and providing for the transition from one range of sizes of articles to be produced to another; return cylinders mounted on said upper crossbar for setting said moving crossarm in an initial position; a cylinder for moving said core rigidly linked to its rod; an auxiliary cylinder, fastened to said upper crossbar, steam being supplied to said core from the plunger of the said cylinder via said core moving cylinder, the condensate being drained from said core through an adjustable pipe secured to the rod of said core moving cylinder.

References Cited

UNITED STATES PATENTS

| | | | |
|---|---|---|---|
| 526,717 | 10/1894 | Laraway et al. | 18—17 |
| 895,650 | 8/1908 | Loomis | 18—17 |
| 1,620,388 | 3/1927 | Palmer | 18—17 |
| 2,544,414 | 3/1951 | Bridgeman et al. | 18—17 |

WILLIAM J. STEPHENSON, *Primary Examiner.*

J. SPENCER OVERHOLSER, *Assistant Examiner.*

U.S. Cl. X.R.

18—38